United States Patent [19]

Lehr

[11] Patent Number: 4,647,626

[45] Date of Patent: Mar. 3, 1987

[54] METHOD AND COMPOSITION FOR IMPROVED MELT PROCESSABILITY OF CHLORINATED POLYVINYL CHLORIDE

[75] Inventor: Marvin H. Lehr, Akron, Ohio

[73] Assignee: The B. F. Goodrich Company, New York, N.Y.

[21] Appl. No.: 807,631

[22] Filed: Dec. 11, 1985

Related U.S. Application Data

[63] Continuation-in-part of Ser. No. 695,766, Jan. 28, 1985, abandoned.

[51] Int. Cl.$^4$ .................. C08L 25/12; C08L 27/24
[52] U.S. Cl. .................... 525/238; 525/192; 525/931
[58] Field of Search ............... 525/238, 192

[56] References Cited

U.S. PATENT DOCUMENTS 3,268,626  8/1966  Jennins et al. ............... 525/238
4,304,884  12/1981  Okamoto ..................... 525/239

FOREIGN PATENT DOCUMENTS 527626  7/1956  Canada ..................... 525/239

OTHER PUBLICATIONS

L. P. McMaster, "Aspects of Polymer-Polymer Thermodynamics" 6 *Macromolecules*, p. 760 (1973).
L. M. Robeson, 24 *Polymer Engineering & Science*, p. 587.
E. A. Joseph, et al., 23 *Polymer*, p. 112 (1982).
O. Olabishi, et al., *Multiphase Polymers*, p. 560 (1978).
J. R. Fried, et al., 50 *J. Appl. Phys.*, p. 6052 (1979).
P. R. Couchman, 11 *Macromolecules*, p. 1156 (1978).
D. J. Walsh, et al., 25 *Polymer*, p. 1330 (1980).
D. J. Walsh, et al., 25 *Polymer*, p. 499 (1984).

*Primary Examiner*—Carman J. Seccuro
*Attorney, Agent, or Firm*—Woodrow W. Ban

[57] ABSTRACT

A composition of matter comprising a blend of CPVC having a chlorine content of between about 60% and 65% by weight and styrene-acrylonitrile copolymer having an acrylonitrile content of between about 15% and 25% by weight. The composition of matter displays substantially single, homogeneous phase behavior with the CPVC and styrene-acrylonitrile copolymer being substantially or completely miscible. Blending of CPVC and styrene-acrylonitrile copolymer provides a resulting blended polymeric material having enhanced temperature and durability properties. Melt processability of CPVC polymeric material may be enhanced by the inclusion of styrene-acrylonitrile copolymer to form the blends.

7 Claims, 7 Drawing Figures

METHOD AND COMPOSITION FOR IMPROVED MELT PROCESSABILITY OF CHLORINATED POLYVINYL CHLORIDE

This is a continuation-in-part of application Ser. No. 695,766 filed Jan. 28, 1985, now abandoned.

FIELD OF THE INVENTION

This invention relates to chlorinated polyvinyl chloride and to methods for enhancing the melt processability of chlorinated polyvinyl chloride. More particularly, this invention relates to blends of chlorinated polyvinyl chloride with other polymeric materials providing enhanced melt processability. Specifically, this invention pertains to miscible blends of chlorinated polyvinyl chloride with other polymeric materials providing enhanced melt processability.

BACKGROUND OF THE INVENTION

While polymer blends have been reported in the literature from time to time, only within the past generation have polymer blends become sufficiently numerous and the advantages of polymer blends sufficiently apparent to warrant widespread investigation. While originally considered rare, miscible polymer blends more recently have been noted with increasing frequency. Miscible blends of a second polymer and a first polymer have found utility in providing enhanced properties such as plasticization, tensile strength, melt processability, and increased resistance to heat distortion. Particularly in applications where polymeric materials are to be subjected to injection molding conditions, it is desirable that the modifying polymers blended into a polymer being injection molded be miscible in the first polymer; miscibility enhances the opportunity for avoiding weld-line strength difficulties and defects in finished, injection molded parts.

The prediction of miscibility between polymer pairs is still an art in infancy; miscibility is believed dependent upon a number of factors that include reactions between functional moieties pendant from one or more of the polymers, hydrogen bonding, and the like. Various suggestions have appeared for assisting in the selection of miscible polymer pairs including an application of Flory's equation of state as set forth by L. P. McMaster, 6 *Macromolecules,* 760 (1973).

Other suggestions for useful tools in assessing miscible polymer pairs have included two-dimensional solubility parameters, inverse gas chromatography; crystallization characteristics of polymer blends; and evaluation of glass transition temperature shifts, as suggested by L. M. Robeson, 24 *Polymer Engineering and Science,* p.p. 589 (June 1984). That the prediction of miscible polymer pairs is still an art, rather than a science, is indicated by, for example, by chlorinated polyethylene having 42 weight percent chlorine being miscible in polyvinyl chloride, while chlorinated polyethylene having a chlorine content less than 42% being immiscible in polyvinyl chloride as shown by Robeson, supra. at p.p. 588.

The prediction of properties of miscible blends is also uncertain. While some blend properties such as tensile strength may follow simple additivity rules, for example as noted for polycarbonate/polyester blends by Joseph, E. A., et al, 23 *Polymer,* p.p. 112 (1982), other blends may show synergistic enhancement of tensile properties as discussed by Olabisi, O., et al, 176 *Adv. Chem. Ser.,* p.p. 559 (1979). Blends characterized by the components being immiscible typically are found to exhibit a tensile strength minimum while blends having components characterized by slight miscibility and a dual glass transition temperature may exhibit both a tensile minimum and a maximum as discussed by Fried, J. R., et al, 50 *Journal of Applied Physics,* p.p. 6052 (1979).

There is some significant indication that polymer blends tend to exhibit partial miscibility, and that graphical depictions of such partial miscibility tend to be of the minimum solution temperature type, that is those solubility curves having a minimum critical solution temperature below which a polymer pair exists in miscible state, and above which, two phases are present, one phase being rich in a first polymer and the second phase being rich in a second polymer; Robeson, supra. p.p. 588. One possible explanation for a lack of solubility between polymer pairs may, in some cases, be related to the minimum critical solution temperature being lower than a glass transition temperature for one or both of the polymers; the polymers being below a glass transition temperature; a melt state for one or both of the polymers being non existent.

A number of substances forming a miscible melt with polyvinyl chloride have been identified in the literature, Robeson, supra. at p.p. 588, however, chlorinated polyvinyl chloride appears to have received less attention. Polyvinyl chloride and chlorinated polyvinyl chloride being chemically different compounds and particularly where properties of a miscible blend of two polymers is in part dependent upon such factors as hydrogen bonding and pendant functional moieties, the simple fact that polyvinyl chloride forms a miscible pair with a second polymer is not a particularly good indicator that chlorinated polyvinyl chloride will also form a miscible pair with the second polymer.

While chlorinated polyvinyl chloride is possessed generally of performance characteristics and, particularly temperature performance characteristics, superior to polyvinyl chloride, enhanced performance characteristics associated with a blend of chlorinated polyvinyl chloride and a second polymer together in a miscible melt state could find substantial industrial utility.

DISCLOSURE OF THE INVENTION

The present invention provides a composition of matter comprising slightly miscible to completely miscible blends of chlorinated polyvinyl chloride having a chlorine content of between about 60% and 67% by weight and a styrene-acrylonitrile copolymer having an acrylonitrile content greater than about 15% and not exceeding about 25% by weight. The composition of the instant invention is melt processable and is characterized by some mutual solubility of the components.

The composition of the instant invention includes components mutually soluble to a greater or lesser extent notwithstanding heating to a temperature of at least 200° C. and preferably, remain at least partially soluble to a temperature of not less than 230° C. Preferably, the composition, upon being formed into a structure by melt processing techniques and subsequent cooling at a rate not less than 40° C. per minute, is substantially free of weld-lined weaknesses. The composition of the instant invention may include processing aids and stabilizers typically employed in the manufacturing of articles formed of CPVC.

Blending chlorinated polyvinyl chloride and styrene-acrylonitrile copolymer having a suitable acrylonitrile content at a temperature and under suitable pressure conditions whereby the chlorinated polyvinyl chloride and styrene-acrylonitrile copolymer are substantially mutually soluble forms a single, substantially continuous phase or two phases characterized by being mechanically compatible in the blend. The resulting blend of chloropolyvinyl chloride possesses improved flow characteristics in the melt state, a substantially singular glass transition temperature, enhanced tensile properties greater than a weight averaging of the tensile strengths of the polymers forming the composition, improved weld-lined fault properties, and improved opacity characteristics when compared to mere blends of chlorinated polyvinyl chloride and styrene-acrylonitrile copolymer in a range of compositions and acrylonitrile content and at a temperature and pressure whereby substantial miscibility between the chlorinated polyvinyl chloride and the styrene-acrylonitrile copolymer does not obtain.

The above and other features and advantages of the instant invention will become more apparent when considered in conjunction with a description of the preferred embodiment of the invention that follows, forming a part of this specification.

BEST EMBODIMENT OF THE INVENTION

The present invention provides a composition of matter comprising a blend of chlorinated polyvinyl chloride and styrene-acrylonitrile copolymer, the blended composition exhibits properties of mutual solubility between the components of the blend, and preferably is characterized by substantial miscibility between the blended polymers. For convenience, as used herein, the term CPVC shall be taken to mean chlorinated polyvinyl chloride, and the term SAN shall be taken to mean styrene-acrylonitrile copolymer.

CPVC is a widely commercially available polymeric material that can be prepared in commercially well known manner such as by suspension chlorination of polyvinyl chloride (PVC). More recently, techniques such as chlorination of PVC employing liquid chlorine, as set forth in U.S. Pat. No. 4,377,459, have become available, and the use of CPVC prepared in any suitable or conventional manner is contemplated as within the purview of this invention.

It has been found, that CPVC employed in the practice of the instant invention should be a PVC material chlorinated to include at least 60% by weight chlorine and not more than about 65% by weight chlorine. A particular sample of CPVC is typically characterized by an average molecular weight and an inherent viscosity associated with a particular degree of PVC polymerization. CPVC is produced by the chlorination of PVC; PVC is the product of polymerizing vinyl chloride monomer and the chain length of any final PVC polymer molecule produced by the polymerization of vinyl chloride monomer may vary somewhat from molecule to molecule. Therefore, upon chlorination, the weight of individual molecules of chlorinated polyvinyl chloride may differ from molecule to molecule so that CPVC also may be characterized by an average molecular weight and an inherent viscosity. It has been found, however, that the degree of chlorination of the CPVC appears to be the controlling factor in determining solubility between CPVC and styrene-acrylonitrile. CPVC employed in the practice of the instant invention typically possesses a weight average molecular weight of between about 73,000 and about 140,000.

SAN employed in the practice of the instant invention is distinct from many commercial variations of SAN available in the marketplace which typically include about 30 weight percent acrylonitrile or more. The SAN suitable for use in the practice of the instant invention should preferably include not less than about 15% and not more than about 25% by weight acrylonitrile. The constituent percentage of acrylonitrile in the SAN is controlled by the ratio of acrylonitrile monomer introduced into a polymerization process with styrene monomer in forming SAN. Appropriate proportions of acrylonitrile monomer and styrene monomer suitable for producing a SAN product having an acrylonitrile content of between about 15% and 25% by weight are known to those skilled in the art of making SAN.

Like CPVC, the weight of individual molecules of SAN can vary from molecule to molecule, but in the practice of the instant invention it is preferable that the weight average molecular weight of SAN copolymer be between about 75,000 and about 150,000.

The CPVC and the SAN are blended together in suitable or conventional manner. For melt phase blending, preferably, blending is conducted above the glass transition temperature for either the CPVC or the SAN to facilitate mixing to form a blend having a single glass transition temperature that may be relatively broad. Alternately solvation of the polymers in a common solvent followed by coprecipitation from the common solvent is a much preferred method for forming molecularly well mixed blends. By glass transition temperature, what is meant is the change in the amorphous region of a polymer from a hard and relatively brittle condition to a viscous or rubbery condition; usually brought about by changing the temperature.

In preferred embodiments, it is desirable that the CPVC and SAN be at least partially miscible one in the other. Optimally a substantially single, homogeneous phase, should result representing a miscible state between the polymers, the SAN and CPVC essentially forming a true solution. But in a zone where the CPVC and SAN are partially to substantially miscible, the percentage of each polymer in the blend may vary from essentially zero to essentially 100%. The actual percentage represented by one of the polymers in the blend in practice will be a percentage producing desirable physical characteristics in a final structure formed from the blended polymers.

Structures formed from the blended composition of the instant invention typically are formed by so called melt processing techniques such as melt spinning or injection molding from the composition in a melt phase. Structures produced from the composition of the instant invention display improved tensile strength characterized as greater than a weight averaging of the tensile strengths of the polymers forming the composition, desirable weld-line strength, that is, strength at joinder lines created particularly during an injection molding process or during heat welding of elements of structures formed from the melt phase composition. Good weld-line strength is typically a characteristic of substantially homogeneous thermoplastic materials and thermosetting resins and relatively and infrequently characterizes blends of polymers that are immiscible or only partially miscible.

Blends of CPVC and SAN can be formed by direct blending of melt state polymeric materials at a temperature above the glass transition temperature for either pure polymer. However, achievement of a homogeneous state may be rendered difficult in such direct blending methods by the elevated viscosity demonstrated by resinous CPVC and SAN materials above a glass transition temperature but below a thermal degradation temperature for the respective materials.

Accordingly, it is has been found advantageous to blend the CPVC and SAN polymeric resins employing solution blending techniques in order to demonstrate miscibility therebetween. In a solution blending operation, the polymers to be blended are dissolved in a solvent in which the polymers are mutually quite soluble, generally at an elevated temperature. The solution of polymers is then poured rapidly into a second solvent in which the first solvent containing the dissolved polymers is soluble but in which the polymers are not soluble. A closely intermixed polymeric precipitate results which can be recovered employing well-known techniques.

EXAMPLE I

A plurality of blends of CPVC and SAN were prepared in accordance with Table I. The CPVC was possessed of a weight average molecular weight of between about 73,000 and about 140,000 while the SAN was possessed of a weight average molecular weight of between about 75,000 and about 150,000. The CPVC and the SAN were blended in equal weight amounts and the equivalent acrylonitrile content by weight of the SAN is depicted. PVC admixtures with SAN were included as controls.

The polymeric blends were prepared by first solution blending the CPVC and the SAN; the CPVC or PVC (0.25 grams) was added to styrene-acrylonitrile polymer (0.25 grams) in jars containing 50 milliliters of 1,2-dichloroethane, the jars were capped, and were heated to 60° in an oven for approximately six hours or until the polymer dissolved, and then poured into a rapidly stirred beaker of approximately 300 milliliters of methanol. A fine powdery precipitate resulted which, after filtration, was dried overnight in vacuum at 80° C. The resulting powdery precipitate was tested employing a thermogravametric analysis to ascertain whether residual solvent evolved in the 150°–200° range. Typically, well dried powdery precipitates demonstrated less than a 0.3 weight percent weight loss due to solvent.

Further analysis employing a differential scanning calorimeter, a Perkin Elmer ® DSC-2, was then performed. Any samples showing a more significant weight loss were further dried at 80° C. until the weight loss by thermogravametric analysis was less than 0.3. In differential scanning calorimetry analysis, the powdery precipitate sample was first heated to between 217° and 237° C. with a lower temperature being used for those precipitates which, by thermogravametric analysis indicated possible temperature instability. The particular temperature range was chosen to approximate a temperature range wherein compounds made employing such blends would be processed for such structure forming techniques such as melt spinning and injection molding. Heating and cooling, within the limitations of the physical equipment, was constrained to 40° C. per minute.

After being once heated to the temperature selected and then cooled to ambient, the powdery precipitate sample was heated to the temperature selected and then quenched at 320° C. per minute.

Where the second temperature elevation within the differential scanning calorimeter DSC-2 indicated a single, substantially narrow glass transition temperature range, and exhibited a single phase by transmission electron miscroscopy analysis at a 25,000×magnification, the sample was deemed to be a completely miscible (noted as M in Table I) blend of the CPVC and SAN. A sample was considered as substantially miscible (noted as SM in Table I) where exhibiting a single glass transition temperature and the presence of a minor second phase under transmission electron miscroscopy. A sample was considered partially miscible (noted as PM in Table I) where a single glass transition temperature was exhibited together with a significant second phase under examination by transmission electron miscroscopy. In the so-called partially miscible blends, that is SM and PM, the dispersed phase was diffuse in appearance indicating dissolution of both polymers in that dispersed phase. Where a sample exhibited two distinct glass transition temperatures and where one, or both, of these glass transition temperatures were shifted from a glass transition temperature associated with the pure components CPVC or SAN polymers, the blends were categorized as substantially immiscible (noted as SI in Table I). Alternately, where a single glass transition temperature was observed owing to the closeness of the glass transition temperatures of the components, but transmission election microscopy showed well separated phases (such as Table I the blend of CPVC 64.1% Cl and SAN 24% AN) the blends were categorized as substantially immiscible. Where two glass transition temperatures were found in the powder by differential scanning calorimetry, and these glass transition temperatures were found to be approximately equal to those associated with the pure components, CPVC, SAN, or PVC the polymers were determined to be mutually immiscible (I). For slightly miscible or immiscible blends, transmission electron miscroscopy indicated distinctly well separated phases.

In the examples, the notation DSV represents the intrinsic viscosity over so-called dilute solution viscosity, that is, the ratio of a solution's specific viscosity to the concentration of the solute, extrapolated to a zero concentration. Intrinsic viscosity is also, occasionally known as limiting viscosity number. $T_g$ in Table I refers to the glass transition temperature for each polymer constituent of the blend.

TABLE I

CPVC OR PVC//SAN (50/50) BLENDS

| | | | Resin | | | | |
|---|---|---|---|---|---|---|---|
| | | | PVC | CPVC # | CPVC # | CPVC # | CPVC # |
| | | | | | Wt % Cl | | |
| SAN Wt % | | | 56.5 | 60.9 | 64.4 | 67.1 | 68.6 |
| Acrylonitrile | DSV | Tg (°C.) | 91 | 109 | Tg (°C.) 129 | 146 | 157 |
| 10[a] | .25 | 109 | — | — | — | I | SI |
| 12.6[a] | .31 | 109 | — | — | SI | SI | — |
| 14.5[a] | .23 | 110.5 | — | I | SI | SI | I |
| 18[a] | .51 | 115 | I | PM | SM | SI | I |
| 21[a] | .69 | 115.5 | I | M | PM | SI | I |
| 24[b] | .48 | 116 | SI | SM | SI | I | I |
| 31[c] | .35 | 118 | I | SI | SI | I | I |

*Series heated to 217° C.
Prepared by solution chlorination of Geon 103EP (B. F. Goodrich) at 80° C. 0.4 g/100 cc methylethylketone at 25° C.
[a] Prepared by B. F. Goodrich
[b] Dow Chemical Tyril 760
[c] Dow Chemical Tyril 03

It is preferable that a blend of CPVC and SAN be substantially a single, homogeneous phase, that is, that the CPVC and the SAN be completely miscible one in the other, in order to achieve optimal results in the performance of the polymers when fabricated into structures. However, satisfactory performance for the polymer blend has been obtained employing blends of CPVC and SAN substantially miscible (SM) as set forth in Table I. Blends of copolymeric SAN containing about 15% to 25% by weight and particularly between about 18% and 24% by weight acrylonitrile and CPVC polymeric material containing between about 60% and 65% by weight and particularly between about 60.5% and 64.5% chlorine can form blends characterized by complete or substantially complete miscibility between the polymers.

EXAMPLE II

Example I was repeated employing a suspension chlorinated CPVC commercially available from B. F. Goodrich known as 627×563 and 686×512, (67% and 63.5% by weight chlorine respectively) however the CPVC comprised 60% by weight of the blends. These blends were then analyzed for tensile strength or to yield, and the result of such testing is displayed as Table II. Commercial CPVC's are prepared in slurry of fluidized bed processes and are known to be heterogeneous, that is, they are physical mixtures of fractions of different weight percent chlorine, which may vary by as much as 7%. Blends of these commercial resins with SAN would be expected only to approximate blends made from solution or homogeneously chlorinated resins of the same weight percent chlorine. Thus CPVC 686×512, which contains an average of 63.5% chlorine, would be expected to have properties approximately intermediate between the 60.9 and 64.4% chlorine resins described in Table I.

TABLE II

| | 1 | 2 | 3 | 4 | 5 | 6 | 7 | 8 |
|---|---|---|---|---|---|---|---|---|
| CPVC | | | | | | | | |
| 686 × 512 (63.5% Cl) | 100 g | — | — | 60 | 60 | — | — | — |
| 627 × 563 (67% Cl) | — | — | — | — | — | 100 | 60 | 60 |
| SAN | | | | | | | | |
| (18% wt. acrylonitrile)[a] | — | 100 | — | 40 | — | — | 40 | — |
| (31% wt. acrylonitrile)[b] | — | — | 100 | — | 40 | — | — | 40 |
| Thermolite 31 (stabilizer) | 3.0 | 3.0 | 3.0 | 3.0 | 3.0 | 3.0 | 3.0 | 3.0 |
| Barium stearate | 0.5 | 0.5 | 0.5 | 0.5 | 0.5 | 0.5 | 0.5 | 0.5 |
| Tensile Stress(psi)[c] | 9,760[d] | 5,400 | 7,570 | 10,600 | 9,423 | 10,690[d] | 9,430 | 7,750 |
| experimental error | ±265 | ±860 | ±670 | ±335 | ±317 | ±110 | ±1020 | ±1270 |
| Elongation (%) | 53 | 2.4 | 2.9 | 7.4 | 4.6 | 26 | 4.9 | 3.7 |
| experimental error | ±20 | ±0.4 | ±0.3 | ±1.8 | ±0.4 | ±10 | ±0.7 | ±0.8 |
| Tg (°C.) | 102 | 106 | 108 | 105 | 102 | 114 | 108 | 112 |

[a] Prepared by B. F. Goodrich
[b] Dow Chemical Tyril 03
[c] Average of 5-6 measurements, samples pressed at 210° C.
[d] Yield stresses For example, blends of 686×512 with SAN containing 18% AN by weight would be expected to be exhibit partial to substantial miscibility. On the other hand blends with a SAN containing 31% AN would be substantially immiscible.

Table II shows that the SAN's are brittle compared at least to CPVCs 686×512 and 627×563. For the SANS both tensile stress and elongation to break were markedly below the yield and elongation values for the CPVC. 18% acrylonitrile containing SAN had a tensile stress about 2000 psi lower than 31% acrylonitrile containing SAN. Nevertheless, when 18% acrylonitrile containing SAN was blended with the 63.5% chlorine CPVC, a synergistic tensile stress was observed, greater than that of either component. This is an enhancement of physical property sometimes observed in partially or substantially miscible blends. In contrast to this behavior, the blends of CPVC with 31% acrylonitrile containing SAN showed no enhancement of tensile stress, the value falling in-between those of the two components of the blend, CPVC and SAN. Furthermore, blends of 31% acrylonitrile containing SAN showed less elongation to break than those 18% acrylonitrile containing blends demonstrating partially miscibility. Since the optimum in property enhancement is a function of the blend composition and is not predictable, the value obtained here with the 60/40 composition may or may not represent an optimum enhancement.

Figure 2:
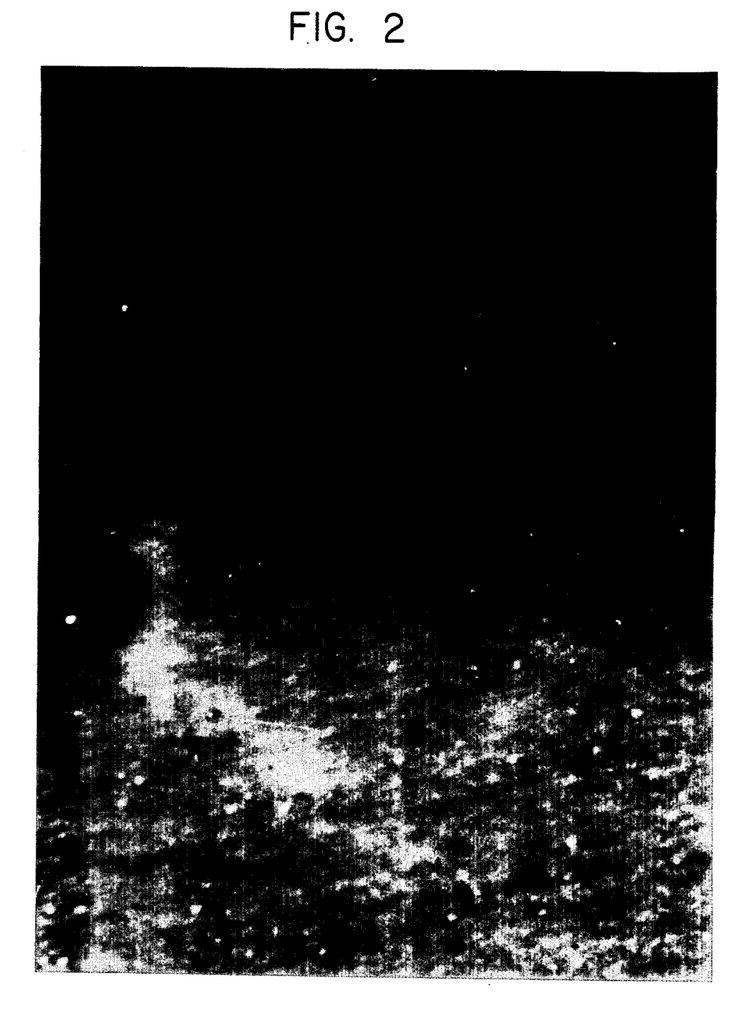

According to the results in Table I a CPVC containing 67% chlorine would be expected to exhibit substantial immiscibility with a SAN containing 18% acrylonitrile. It would be expected to be immiscible with a SAN containing 31% acrylonitrile. The results in Table II and FIG. 2 show that the tensile stress of blends including 31% acrylonitrile containing SAN showed no property enhancement. The blend with the 18% acrylonitrile containing SAN afforded a tensile stress falling within the weighted average of the two components. On the other hand, the blend with the 31% acrylonitrile containing SAN exhibited a tensile and elongation value no greater than that of the 31% acrylonitrile containing SAN alone. In fact this result suggests that these blends might exhibit a minimum in tensile at some other composition (proportion to CPVC), which is characteristic of immiscible blends. The blends of Table I were obviously quite brittle as indicated by a less than 5% typical elongation to break and the scatter in breaking (tensile) values. The fact that the tensile value for the blend with 18% acrylonitrile containing SAN showed a slightly improved tensile over the pure SAN suggests that even substantially immiscible CPVC/SAN blends may exhibit sufficient mechanical cohesiveness to have utility in contrast to clearly immiscible blends which appeared to have little or no mechanical cohesiveness.

Figure 5:
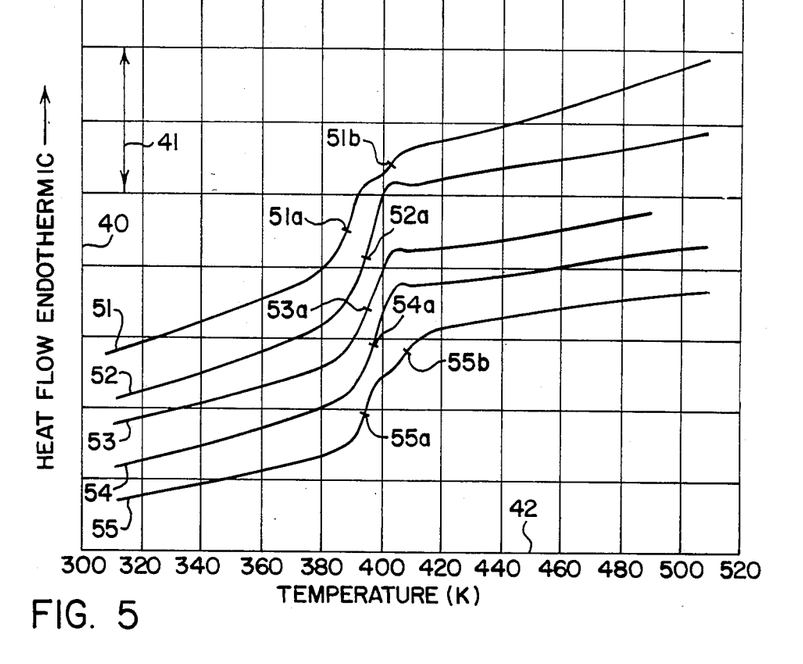
FIG. 5 is a graphical representation of a relationship between heat flow and temperature representing the results of differential calorimeter analysis.

Referring to the drawings, FIG. 5 is a depiction of differential scanning calorimeter data generated for the 50/50 CPVC/SAN blends of the solution chlorinated PVC containing 64.4% chlorine as set forth in Table I. The various blends were heated initially to 510 K. (237° C.), except for the blend with 21% acrylonitrile containing SAN, cooled, and then reheated to the same temperature.

FIG. 5 includes an axis 40 plotting exothermic heat flow wherein a distance 41 along the axis 40 represents 4.2 mJ/sec, and an ordinate 42 plotting temperature in degrees Kelvin. A plurality of curves 51, 52, 53, 54, 55 plot the heat flow as a function of temperature for CPVC having 64.4 wt % chlorine and SAN in a 50/50 ratio with the SAN including 14.5; 18.0; 21.0; 24.0; and 31.0 wt % acrylonitrile respectively. Each curve 51–55 includes at least one glass transition temperature 51a, 51b, 52a, 53a, 54a, 55a, 55b, as indicated by midpoint dashes.

The curves 51 and 55 show clearly two glass transitions 51a, 51b, 55a, 55b for the blends including SAN containing 14.5 and 31% acrylonitrile by weight. Since the lower or first transition 51a, 55a, arises from the SAN and is shifted to a slightly higher temperature than that of the corresponding pure SAN, these blends graphically depicted at 51, 55 are determined to be only slightly miscible, and from a more practical standpoint, are defined as being substantially immiscible.

The curves 52–54 each demonstrate a single glass transition temperature 52a, 53a, 54a, indicating homogeneous or substantially single phased blends. Differential scanning calorimetry is not an unequivocal test for complete miscibility or the existence of a single phase, especially when glass transition temperatures of the component polymers of phases present in a blend are close together. It is often necessary to complement the DSC test with some other test such as transmission electron miscroscopy to determine if one or two phases exist.

EXAMPLE III

Using the method of Example I, two families of blends were developed employing B. F. Goodrich Company 686×512 CPVC containing approximately 63.5% chlorine by weight. One blend family included SAN including 18% acrylonitrile in proportions of 0%, 20%, 40%, 60%, 80% and 100% by weight of the blend. The second blend family SAN including 31% acrylonitrile, the SAN being contained in the blend in proportions of 0%, 20%, 40%, 60%, 80% and 100% by weight of the blend. A plurality of specimens of each member of each blend family was tested for tensile strength with the results being depicted in FIGS. 6–7.

Figure 6:
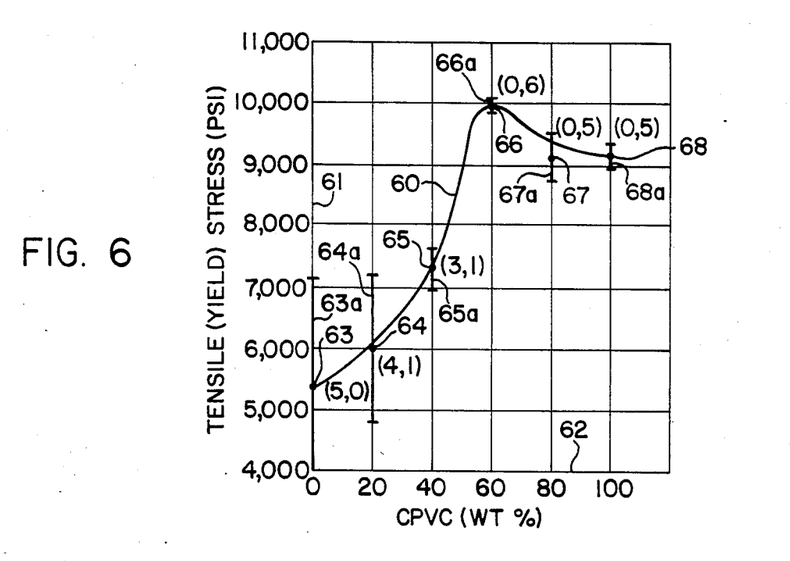
FIGS. 6 and 7 are graphical representations of a relationship between tensile/yield strength and CPVC content representing the results of tensile strength analysis.

FIG. 6 is a graphical representation 60 of tensile/yield strength plotted on an axis 61 versus weight percent CPVC contained in a blend with SAN including 18% by weight acrylonitrile plotted along on abscissa 62. Data points 63, 64, 65, 66, 67, 68 represent average tensile stress results for samples tested at a particular CPVC content. Parentheticals adjacent each data point represent the number of brittle versus ductile failures. Bar ranges 63a, 64a, 65a, 66a, 67a, 68a axially surround the data points and represent a 2 sigma range of tensile strength fitting the data for the associated data point.

The curve 60 exhibits a maximum at the data point 66 but includes an end point minimum at data point 63. The curve 60 indicates a synergistic tensile strength enhancement for this blend CPVC and 18% acrylonitrile containing SAN, an enhancement frequently characterizing miscible polymer systems. The curve 60 represents tensile strengths greater than those predicted by a mere weight averaging of the tensile strengths of the pure polymers forming the composition. Such a prediction would be represented by a straight line joining the points 63 and 68.

Figure 7:
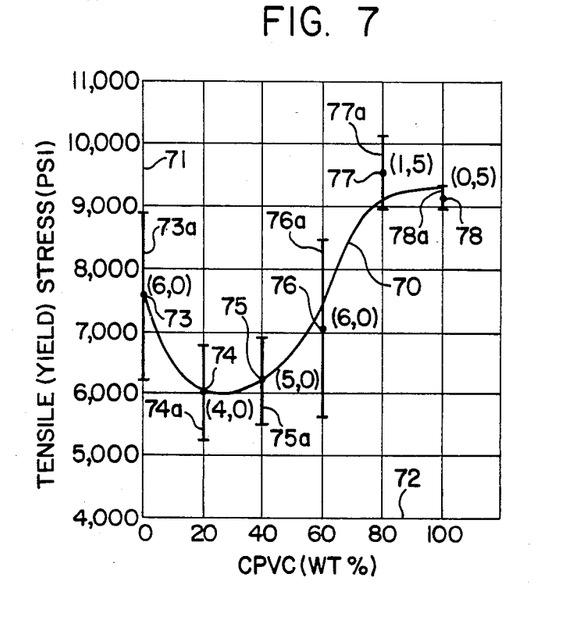

Referring to FIG. 7, a curve 70 represents a relationship between tensile strength plotted on an axis 71 versus weight percent CPVC contained in blends formed with SAN containing 31% by weight acrylonitrile plotted on an abscissa 72. Data points 73, 74, 75, 76, 77, 78 represent average tensile stress results for samples tested at particular CPVC contents. Parentheticals adjacent each data point represent the number of brittle versus ductile failures. Bar ranges 73a, 74a, 75a, 76a, 77a, 78a axially surround the data points and represent a 2 sigma range of tensile strength fitting the data for the associated data point.

The curve 70 exhibits a minimum adjacent the data point 74 and may exhibit a slight maximum adjacent the data point 77, but does not indicate the synergistic strength enhancement of the curve 60 in FIG. 6. Minimum exhibiting curves such as the curve 70 frequently are representative of insoluble polymer systems.

Figure 1:
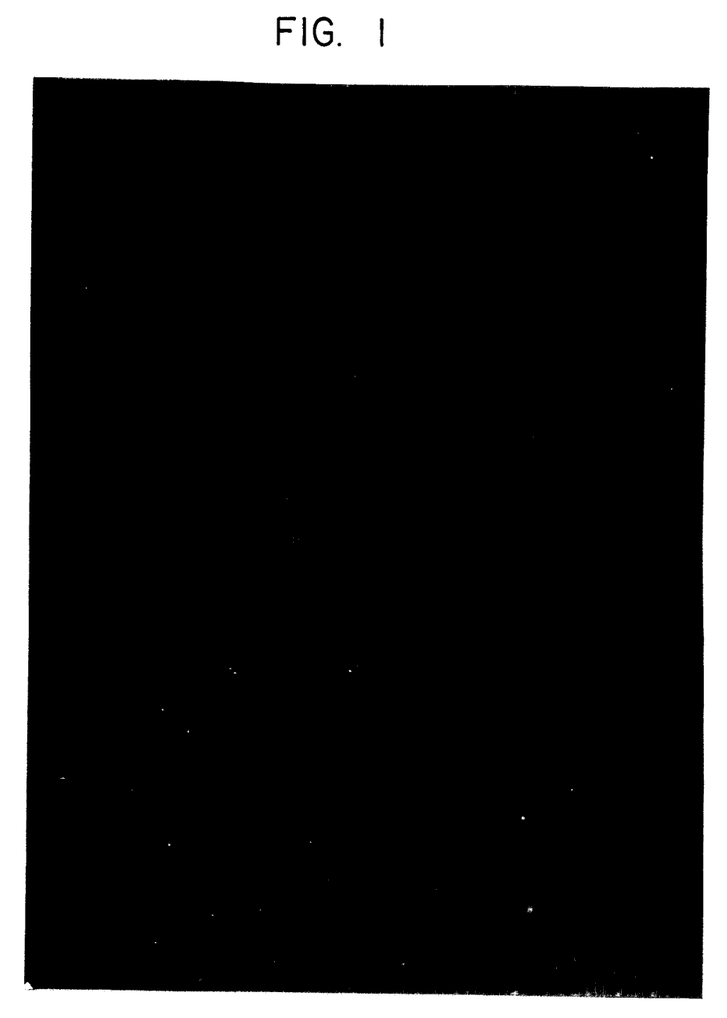
FIGS. 1-4 are photomicrographs of blends of CPVC and SAN.

Referring to the drawings, FIG. 1 is a transmission electron photomicrograph at a 25,000 magnification of the blend containing the 18% acrylonitrile containing SAN. (Curve 52 in FIG. 5). No staining was employed to show the phase contrast in these micrographs; the dark regions are the higher density phase, which could be pure CPVC or a CPVC-rich phase. The micrograph of FIG. 1 depicts two phases, a substantially continuous phase which appears as dark domains 11 somewhat diffuse in appearance constituting a CPVC or CPVC-rich phase. Lighter domains 13 constitute the SAN or SAN-rich phase as dispensed 0.02-0.04 um (micrometers) spheres. The diffuse appearance and relatively sparse concentration, for a 50/50 blend, of the SAN-rich phase domains 13 and the occurrence of a single Tg indicate that this blend is substantially miscible.

Referring to the drawings, FIG. 2 is a photomicrograph of the blend depicted by curve 53 of FIG. 5 and having 21% acrylonitrile containing SAN. Two phases, light 15 and dark 17 are present, both in roughly equal proportion which phases are very diffuse in appearance. This diffuseness plus the occurrence of a single glass transition temperature causes this blend to be designated as a partially miscible blend.

Figure 3:
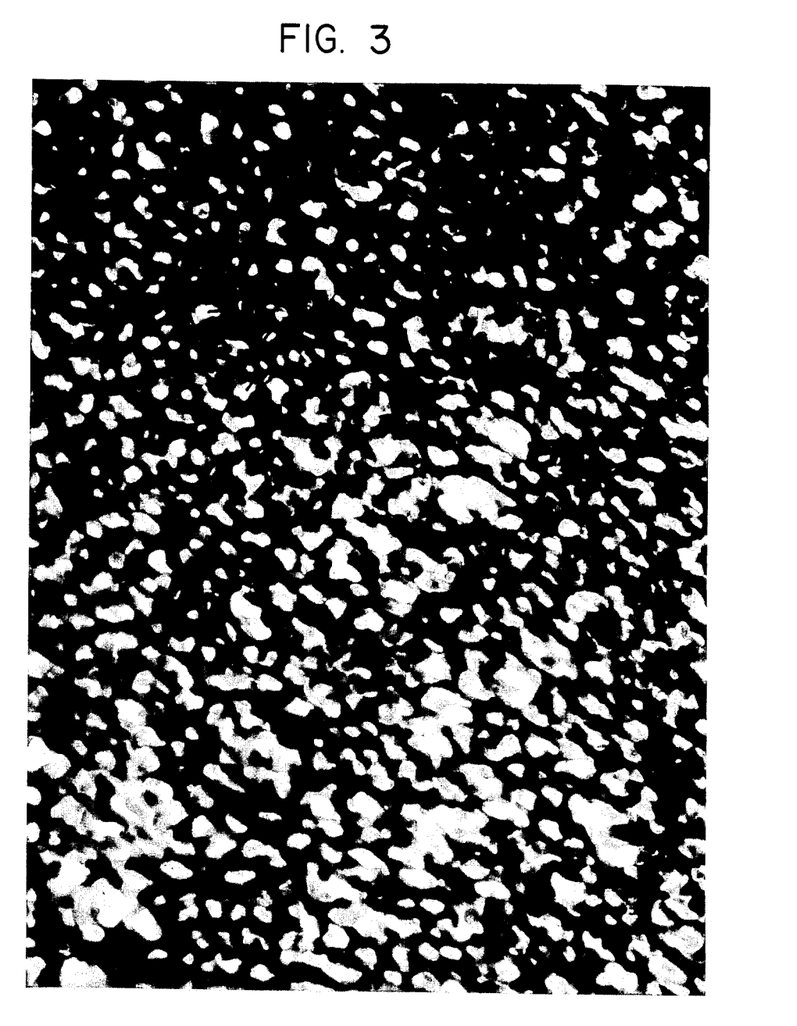

FIG. 3 is a photomicrograph of the blend depicted by curve 54 of FIG. 5 having 24% acrylonitrile containing SAN and demonstrating one glass transition temperature. From the photomicrograph it is apparent that two well separated phases 21, 23 exist, however. This evident dichodomy can be explained by assuming that phase separation occurs gradually as temperature is increased. Initially one phase is rich in SAN and the other rich in CPVC. Thus the glass transition temperature of the SAN will be raised a little by the solution of some CPVC in that phase. On the other hand, the glass transition temperature of the CPVC phase will be lowered by the solution of some SAN in that phase. Since the glass transition temperatures of the pure SAN and CPVC polymers differ by only 13° C., it is not unreasonable to expect a set of conditions wherein the SAN-rich phase and the CPVC-rich phase have corresponding transition temperatures so much closer than 13° C. that these temperatures overlap and appear as one transition temperature.

Figure 4:
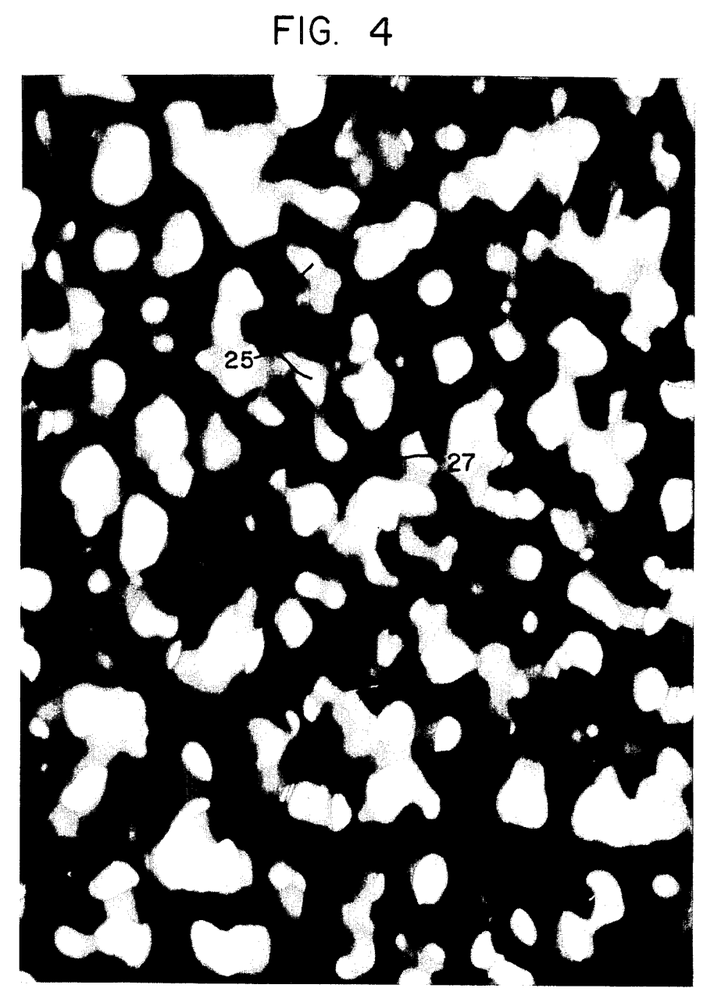

FIG. 4 depicts a photomicrograph of the blend depicted in FIG. 5 by the curve 55 having 31% acrylonitrile containing SAN which exhibited two glass transition temperatures 55a, 55b, by differential scanning calorimetry. Light 25 and dark 27 phases are well separated and exist in significantly larger domains than those of FIG. 3. This blend would otherwise be considered immiscible if it were not for the observation that the glass transition temperature of the SAN phase was 122° C., a 4° C. elevation from the transition temperature of pure SAN. Thus, some CPVC was dissolved in this SAN phase after heating to 237° C. This blend is therefore designated as substantially immiscible.

Where the CPVC and SAN polymers are miscible (M) or substantially miscible (SM) or even partially miscible (PM), the relative proportions of CPVC and SAN in the blend is substantially irrelevant to the formation of the miscible phase. Particularly for miscible (M) and substantially miscible (SM) blends, the CPVC and SAN can be present in any proportion and still provide desirable properties in finished structures attributable to the blending of CPVC and SAN in accordance with the invention.

While a preferred embodiment of the invention has been shown and described in detail, it is apparent that various modifications may be made thereto without departing from the scope of the claims that follow.

What is claimed is:

1. A composition of matter melt processible in a substantially homogeneous state consisting essentially of: chlorinated polyvinyl chloride having a chlorine content of between about 60% and 65% by weight; and styrene-acrylonitrile copolymer having an acrylonitrile content of between about 15% and 25% by weight, the composition being possessed of a substantially singular glass transition temperature and a tensile strength greater than a weight averaging of the tensile strengths of the polymers forming the composition.

2. The composition of claim 1, being substantially homogeneous when heated to a temperature of at least 200° C. and then cooled at not less than 40° C. per minute.

3. The composition of claim 2, the temperature being 230° C.

4. The composition of claim 1, the composition being, upon melt processing and subsequent cooling, substantially free of weld line weakness.

5. A method for improving the melt processability of chlorinated polyvinyl chloride having a chlorine content of between about 60% and 65% by weight comprising the steps of: providing a styrene acrylonitrile copolymer having an acrylonitrile content of between 15% and 25% by weight and blending the chlorinated polyvinyl chloride with the styrene acrylonitrile copolymer to form a substantially homogeneous, substantially single phased melt, the resulting blend being possessed of a substantially singular glass transition temperature and a tensile strength greater than a weight averaging of the tensile strengths of the polymers forming the melt.

6. The method of claim 5, the melt being formed by the blend being heated to a temperature of at least 200° C.

7. The method of claim 6, the temperature being at least 230° C.

* * * * *